United States Patent Office 3,027,364
Patented Mar. 27, 1962

3,027,364
FATTY ACID ESTERS OF ALDOSE-SEMICARBA-ZONES AND ALDOSE-THIOUREIDE
Kurt Knoevenagel, Kleinkarlbach, near Gruenstadt Kreis Frankenthal, Germany, assignor to C. F. Spiess & Sohn Chemische Fabrik, Kleinkarlbach uber Grunstadt, Germany
No Drawing. Filed July 15, 1959, Ser. No. 827,167
Claims priority, application Germany July 17, 1958
3 Claims. (Cl. 260—211.5)

The present invention concerns novel aldose derivatives of the following formulae:

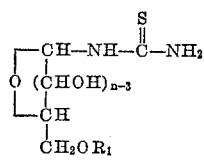

and

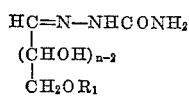

wherein $n$ is an integer from 5 to 6 and $R_1$ is the acyl radical of a higher fatty acid.

The aldose derivatives according to the invention are useful for a wide variety of purposes, for example, as intermediates in the pharmaceutical industry, but more especially as emulsifying agents.

The compounds according to the invention can be prepared by reacting an aldose-semicarbazone or an aldose-thioureide respectively of the formulae

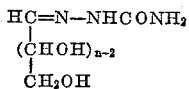

and

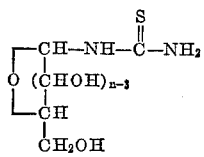

wherein $n=5$ or 6 with an ester of the formula $R_5OR_1$, where $R_1$ is as hereinbefore defined and $R_5$ is a group such that the compound $R_5OH$ is a lower mono- or poly hydric alcohol, but it can also be in some cases a higher alcohol. Preferably $R_5OH$ is a relatively volatile alcohol and preferably $R_5$ is an alkyl group containing not more than four carbon atoms.

The use of this transesterification reaction ensures that only the primary hydroxyl group of the aldose-semicarbazone or aldose-thioureide of the above formulae is esterified. The reaction is carried out under the conditions normally used for esterification reactions; thus it is preferable to operate in an inert solvent, especially dimethylformamide, though pyridine and morpholine can be used, and at an elevated temperature. Generally speaking it is preferable to operate at a temperature from 20° C. to 100° C. for from 20 to 2 hours, the lower temperature being preferred where there is substantial risk of thermal decomposition of the reactants. In order to facilitate the removal of the relatively volatile alcohol $R_5OH$, it is advisable to operate under reduced pressure and to pass a slow stream of inert gas through the reaction mixture.

The speed of the reaction, and the yield and purity of the product of the reaction is often increased by carrying out the reaction in the presence of a basic catalyst such as potassium carbonate, calcium oxide, or calcium hydride in an amount of 1 to 100 mole percent.

Furthermore it has been found that it will be advisable to carry out the reaction in the presence of metals and/or metal salts which are suitable to form complex compounds with amines such as Zn, Co, Ni as well as the oxides, hydroxides or carbonates of them alone or together with the above mentioned base catalysts. In many cases the reaction takes place only in the presence of these substances.

As the additional catalyst there may be added the oxide or carbonate of a transition metal having an atomic number of 24 to 30. Particularly good results are obtained with a mixture of potassium carbonate and zinc oxide.

Although the action of the second catalyst is not fully understood it is thought that it acts by forming a complex with amine-containing decomposition products of the starting material.

The following examples illustrate the invention.

*Example I*

17 g. of glucose semicarbazone are dissolved in 200 cc. of dimethylformamide and then 22.5 g. of methyl stearate, 2 g. of zinc oxide and 1 g. of potassium carbonate are added. The mixture is heated to 55° C. for 15 hours and kept under a reduced pressure of 80 mm. Hg. After heating the catalyst and the excess of glucose semicarbazone are filtered off. By standing overnight in a refrigerator excess of methyl stearate separates from the filtrate. It is filtered off and then the dimethylformamide is distilled off under reduced pressure. The residue is washed with a small amount of ether, and 1.5 g. of 6-stearoyl-glucose semicarbazone are obtained in form of a white solid with a melting point of 27° C. It is soluble in acetone and absolute ethyl alcohol but only slightly soluble in cold water. The substance shows very good emulsifying abilities.

*Example II*

23.8 g. (0.1 mole) of glucose thioureide are dissolved in 200 cc. of dimethylformamide and then 29.8 g. (0.1 mole) of methyl stearate, 2 g. of zinc oxide and 1 g. of potassium carbonate are added. The mixture is heated to 85° C. for 15 hours and kept under a reduced pressure of 80 mm. Hg. After heating the catalyst is filtered off and the dimethylformamide distilled off under reduced pressure. The residue is dissolved in absolute ethyl alcohol. By filtering the alcoholic solution the excess of glucose thioureide is recovered. Then the alcohol is distilled off, and the residue is crystallized from ether. The 6-stearoyl-glucose thioureide is obtained as a light pink solid substance. It has a melting point of 58–59° C. and is soluble in absolute alcohol and somewhat soluble in ether but only sparingly soluble in cold water.

The thus obtained new esters can be used for several different purposes. The esters with fatty acids show good emulsifying abilities. By using 1% or 2% of a single or also of a mixture of several esters it is possible to obtain stable emulsions for instance containing in the range from 30% up to even 45% xylene with water.

What I claim is:
1. An aldose derivative of a general formula selected from the group consisting of

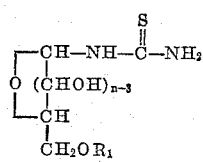

and
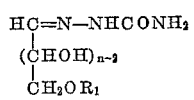
wherein $n$ is an integer from 5 to 6 and $R_1$ is the acyl radical of a higher fatty acid.
2. 6-stearoyl-glucose-semicarbazone.
3. 6-stearoyl-glucose-thioureide.
References Cited in the file of this patent
UNITED STATES PATENTS
2,903,446   Osipow ------------------ Sept. 8, 1959